United States Patent
Xiao (10) Patent No.: US 11,997,356 B2
(45) Date of Patent: May 28, 2024

(54) VIDEO PAGE DISPLAY METHOD AND APPARATUS, ELECTRONIC DEVICE AND COMPUTER-READABLE MEDIUM

(71) Applicant: BEIJING BYTEDANCE NETWORK TECHNOLOGY CO., LTD., Beijing (CN)

(72) Inventor: Junpeng Xiao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 16 days.

(21) Appl. No.: 17/782,154

(22) PCT Filed: Nov. 6, 2020

(86) PCT No.: PCT/CN2020/127241
§ 371 (c)(1),
(2) Date: Jun. 2, 2022

(87) PCT Pub. No.: WO2021/114979
PCT Pub. Date: Jun. 17, 2021

(65) Prior Publication Data
US 2023/0011395 A1      Jan. 12, 2023

(30) Foreign Application Priority Data
Dec. 13, 2019   (CN) .......................... 201911285790.1

(51) Int. Cl.
*H04N 21/472* (2011.01)
*G06F 3/04847* (2022.01)

(52) U.S. Cl.
CPC ... *H04N 21/47217* (2013.01); *G06F 3/04847* (2013.01)

(58) Field of Classification Search
None
See application file for complete search history.

(56) References Cited

U.S. PATENT DOCUMENTS

| 6,597,375 B1 * | 7/2003 | Yawitz ................. G11B 27/34 715/725 |
| 8,413,184 B2 * | 4/2013 | Angquist ............. G11B 27/322 725/38 |

(Continued)

FOREIGN PATENT DOCUMENTS

| CN | 103118293 A | 5/2013 |
| CN | 103927107 A | 7/2014 |

(Continued)

OTHER PUBLICATIONS

Translation of International Search Report and Written Opinion, International application No. PCT/CN2020/127241, dated Feb. 18, 2021, 8 pages.

*Primary Examiner* — Toan H Vu
(74) *Attorney, Agent, or Firm* — BakerHostetler (57) ABSTRACT

Disclosed in embodiments of the present disclosure are a video page display method and apparatus, an electronic device and a computer-readable medium. A specific implementation of the method includes: displaying a video page, the video page including a video playback view and a dialog box, and a progress adjustment control being displayed in the dialog box, wherein the view hierarchy of the dialog box is higher than the view hierarchy of the video playback view and the remaining controls in the video page; and in response to detecting a first user operation on the progress adjustment control, adjusting the progress of a video currently being played back in the video page, and updating the progress displayed in the progress adjustment control. The described implementation achieves the reuse of a progress adjustment control between different pages.

14 Claims, 7 Drawing Sheets

(56) References Cited

U.S. PATENT DOCUMENTS

| | | | |
|---|---|---|---|
| 9,240,215 B2 * | 1/2016 | Eppolito | G11B 27/322 |
| 11,153,663 B2 * | 10/2021 | Montgomery | H04N 21/8455 |
| 2007/0204238 A1 * | 8/2007 | Hua | G06F 16/745 |
| | | | 715/838 |
| 2010/0262911 A1 * | 10/2010 | Kaplan | G11B 27/105 |
| | | | 715/719 |
| 2010/0281372 A1 * | 11/2010 | Lyons | G06F 3/0486 |
| | | | 715/720 |
| 2011/0105225 A1 * | 5/2011 | Huang | G11B 27/034 |
| | | | 463/36 |
| 2012/0033948 A1 * | 2/2012 | Rodriguez | G11B 27/034 |
| | | | 386/282 |
| 2012/0159327 A1 * | 6/2012 | Law | H04N 21/47217 |
| | | | 715/716 |
| 2013/0073961 A1 * | 3/2013 | Agnoli | G11B 27/034 |
| | | | 715/716 |
| 2014/0270708 A1 * | 9/2014 | Girgensohn | H04N 21/44008 |
| | | | 386/282 |
| 2015/0007027 A1 * | 1/2015 | Anderson | H04L 65/764 |
| | | | 715/760 |
| 2015/0019969 A1 * | 1/2015 | Lee | G06F 16/7844 |
| | | | 715/719 |
| 2017/0018217 A1 | 1/2017 | Ogino et al. | |
| 2017/0178525 A1 | 6/2017 | Kwan | |
| 2018/0330756 A1 * | 11/2018 | MacDonald | G06F 16/951 |
| 2019/0132648 A1 * | 5/2019 | Zimmerman | H04N 21/47217 |
| 2021/0031115 A1 * | 2/2021 | McCoy | A63F 13/67 |

FOREIGN PATENT DOCUMENTS

| | | |
|---|---|---|
| CN | 105100917 A | 11/2015 |
| CN | 107566620 A | 1/2018 |
| CN | 107613362 A | 1/2018 |
| CN | 108124059 A | 6/2018 |
| CN | 109286847 A | 1/2019 |
| CN | 109558009 A | 4/2019 |
| CN | 110958481 A | 4/2020 |
| WO | 2014/194527 A1 | 12/2014 |

* cited by examiner

201 — displaying a video page; and the video page includes a video play view and a dialog box, a progress adjusting control is displayed in the dialog box, and a view hierarchy of the dialog box is higher than view hierarchies of the video play view and a remaining control in the video page 202 — adjusting progress of a currently playing video in the video page and updating the progress displayed in the progress adjusting control in response to detecting a first user operation on the progress adjusting control

VIDEO PAGE DISPLAY METHOD AND APPARATUS, ELECTRONIC DEVICE AND COMPUTER-READABLE MEDIUM

The present disclosure is the national phase application of PCT International Patent Application No. PCT/CN2020/127241, filed on Nov. 6, 2020, which claims priority of Chinese patent application entitled "Video Page Display Method and Apparatus, Electronic Device and Computer-readable medium" filed to the Patent Office of China on Dec. 13, 2019, with the Application No. 201911285790.1, the disclosure of which is incorporated herein by reference in their entireties.

TECHNICAL FIELD

Embodiments of the present disclosure relate to a field of computer technology, and in particular, relate to a video page display method, an apparatus, an electronic device, and a computer-readable medium.

BACKGROUND

Continuous popularization of electronic devices has greatly facilitated people's lives. People can carry out various entertainment activities such as playing movies, playing music, watching live broadcasts, etc. through various electronic devices represented by smartphones and video applications installed thereon. Related video applications usually achieve adjusting video progress by adding controls such as a progress bar. A typical solution is to add controls such as a progress bar to a MainTab of a video play application, and such a method has a problem that a progress bar cannot be multiplexed in a plurality of pages.

SUMMARY

The summary of the present disclosure serves to introduce concepts in a simplified form, and these concepts are described in detail in the detailed description that follows. The summary of the present disclosure is not intended to identify key features or essential features of the claimed technical solution, nor is it intended to be used to limit the scope of the claimed technical solution.

Some embodiments of the present disclosure propose a video page display method, apparatus, an electronic device, and a computer-readable medium to solve the technical problem as mentioned in the background above.

In a first aspect, some embodiments of the present disclosure provide a video page display method, comprising: displaying a video page, wherein, the video page includes a video play view and a dialog box, a progress adjusting control is displayed in the dialog box, and a view hierarchy of the dialog box is higher than view hierarchies of the video play view and a remaining control in the video page; and adjusting progress of a currently playing video in the video page and updating progress displayed in the progress adjusting control, in response to detecting a first user operation on the progress adjusting control In a second aspect, some embodiments of the present disclosure provide a video page display apparatus, comprising: a page display unit, configured to display a video page; wherein, the video page includes a video play view and a dialog box; a progress adjusting control is displayed in the dialog box; and a view hierarchy of the dialog box is higher than view hierarchies of the video play view and a remaining control in the video page; and an adjusting unit, configured to adjust progress of the currently playing video in the video page and updating progress displayed in the progress adjusting control, in response to detecting a first user operation on the progress adjusting control In a third aspect, some embodiments of the present disclosure provide an electronic device, comprising: one or more processors; and a storage apparatus, on which one or more programs are stored, wherein, in the case where the one or more programs are executed by the one or more processors, the method according to any one of embodiments of the present disclosure is realized by the one or more processors.

In a fourth aspect, some embodiments of the present disclosure provide a computer-readable medium, wherein a computer program is stored on the computer-readable medium, and in the case where the computer program is executed by a processor, the method according to any one of embodiments of the present disclosure is realized.

In a fifth aspect, some embodiments of the present disclosure provide a computer program, comprising a program code, wherein, in the case where the computer program is run by a computer, the method according to any one of embodiments of the present disclosure is executed by the program code.

One embodiment of the above-described respective embodiments of the present disclosure has beneficial effects below: because a video page includes a dialog box, and a view hierarchy of the dialog box is higher than view hierarchies of a video play view and a remaining control, a video progress adjustment operation of a user may be preferentially responded to. In addition, because the dialog box is an independent window, which may be attached to any page, so as to achieve multiplexing a progress adjusting control between different pages.

BRIEF DESCRIPTION OF THE DRAWINGS

The above-described and other features, advantages and aspects of the respective embodiments of the present disclosure become more apparent when taken in conjunction with the accompanying drawings and with reference to the detailed description below. Throughout the drawings, same or similar reference signs refer to same or similar elements. It should be understood that the drawings are schematic and that originals and elements are not necessarily drawn to scale.

DETAILED DESCRIPTION

Embodiments of the present disclosure are described in more detail below with reference to the accompanying drawings. While certain embodiments of the present disclosure are shown in the drawings, it should be understood that the present disclosure may be embodied in various forms and should not be construed as limited to the embodiments set forth herein. Rather, these embodiments are provided for thorough and complete understanding of the present disclosure. It should be understood that the drawings and the embodiments of the present disclosure are only for exemplary purposes, and are not intended to limit the protection scope of the present disclosure.

In addition, it should be noted that, for convenience of description, only the parts related to the present disclosure are shown in the drawings. The embodiments of the present disclosure and the features of the embodiments may be combined with each other without conflict.

It should be noted that concepts such as "first" and "second" as mentioned in the present disclosure are only used to distinguish different apparatuses, modules or units, and are not used to limit orders of functions executed by these apparatuses, modules or units or interdependence thereof.

It should be noted that modifications of "a" and "a plurality" as mentioned in the present disclosure are exemplary rather than limitative; and those skilled in the art should understand that, unless otherwise clearly indicated in the context, they should be understood as "one or more".

The names of messages or information exchanged between a plurality of apparatuses according to the implementation modes of the present disclosure are only for exemplary purposes, and are not intended to limit the protection scope of these messages or information.

The present disclosure is described in detail below with reference to the accompanying drawings and in conjunction with the embodiments.

Figure 1A:
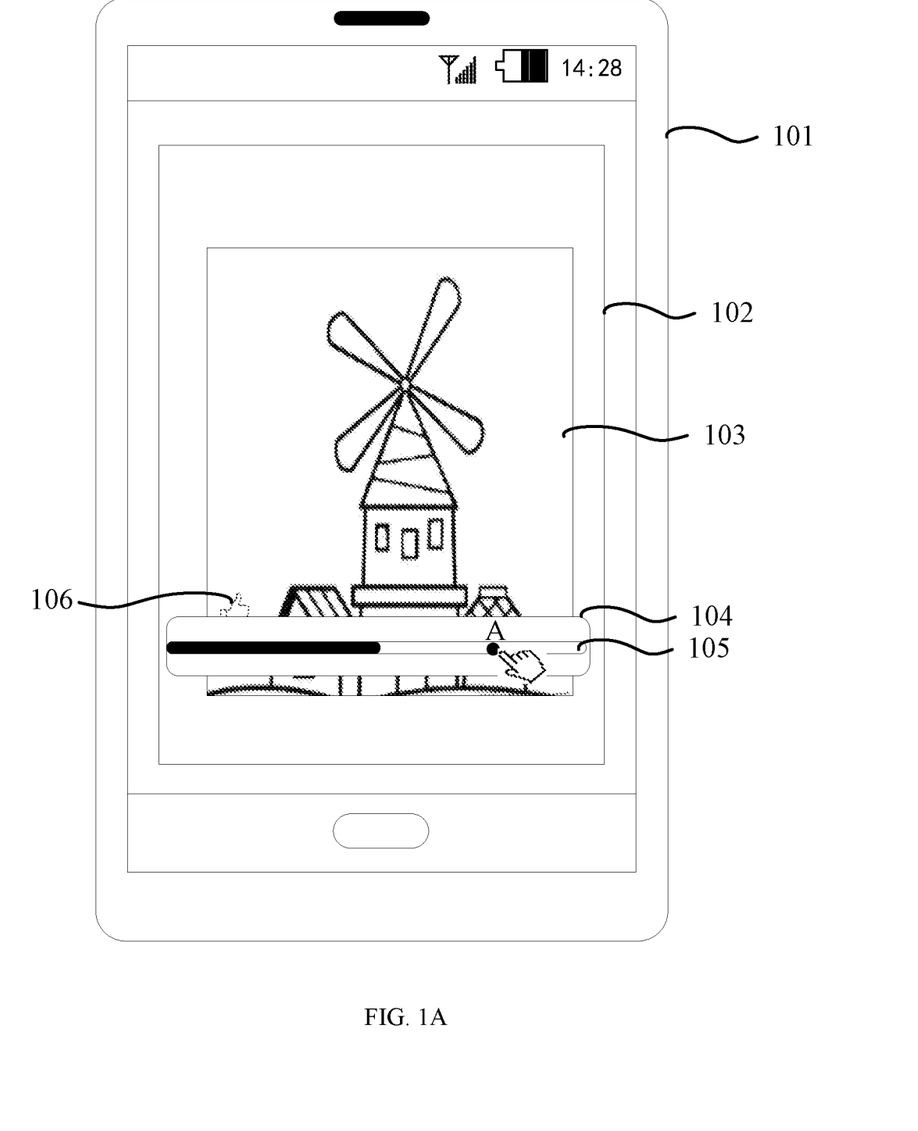
FIG. 1A-FIG. 1B are schematic diagrams of an application scenario of a video page display method according to some embodiments of the present disclosure.
Figure 1B:
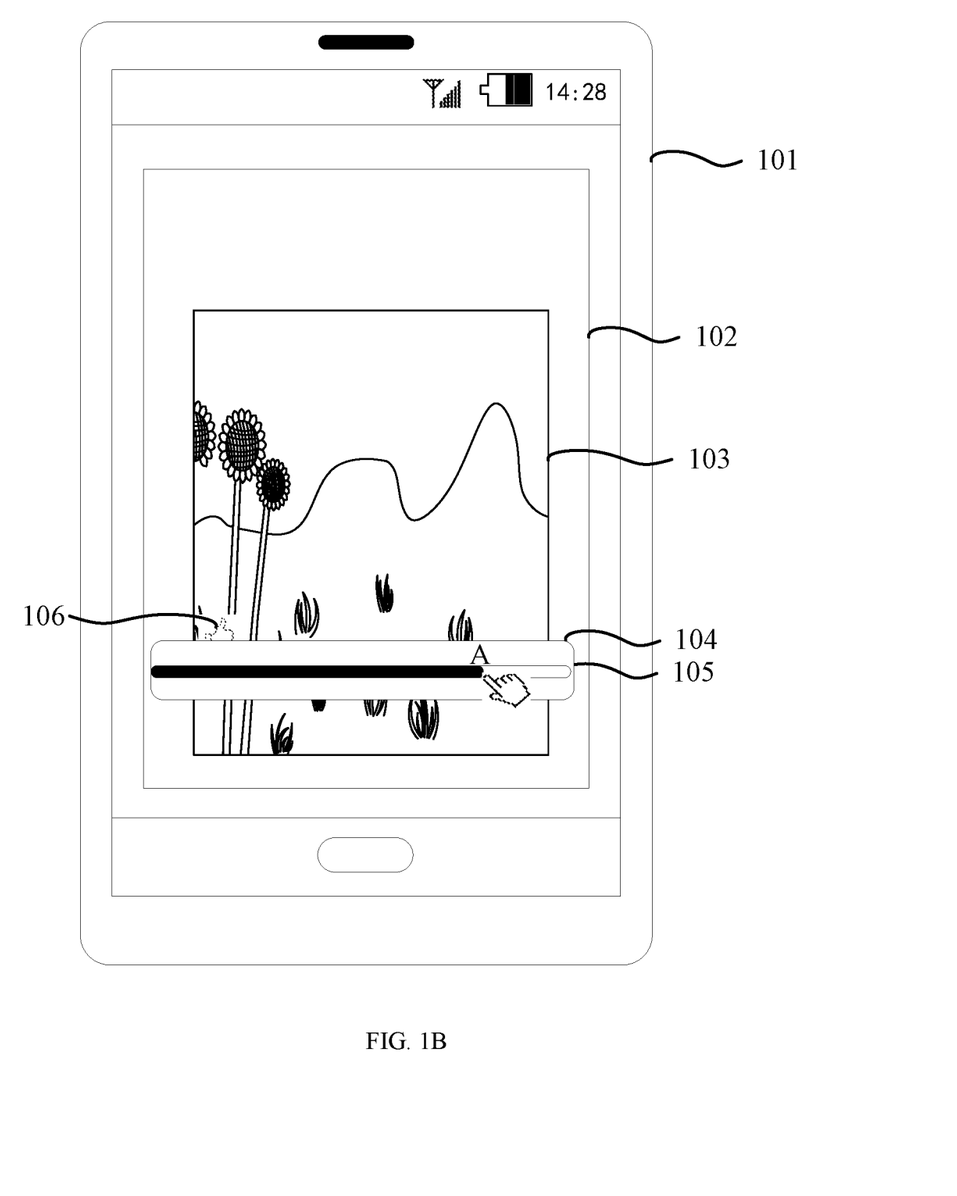

FIG. 1A-FIG. 1B are schematic diagrams of an application scenario of a video page display method according to some embodiments of the present disclosure.

The video page display method provided by some embodiments of the present disclosure is usually executed by a terminal device. It should be noted that the terminal device may be hardware or software. In the case where the terminal device is hardware, it may be various electronic devices that support video processing, including but not limited to, smartphones, tablet personal computers, e-book readers, vehicle-mounted terminals, etc. In the case where the terminal device is software, it may be installed in the electronic devices as listed above. The terminal device may be implemented, for example, as a plurality of pieces of software or software modules for supplying distributed services, or may also be implemented as a single piece of software or a software module, which is not specifically limited here.

In the application scenario shown in FIG. 1A, an executive body of the video page display method may be a video stream viewing application installed on a smartphone 101. Thus, the video stream viewing application may display a video page 102 through a screen of the smartphone 101. The video page 102 includes a video play view 103 and a dialog box 104, and the dialog box 104 displays a progress adjusting control 105. In the application scenario, the progress adjusting control is a progress bar. A view hierarchy of the dialog box 104 is higher than view hierarchies of the video play view 103 and a remaining control in the video page 102. For example, a user interaction control 106 (hand like) may be included in the video page 102. In this situation, the dialog box 104 may be displayed on an upper hierarchy of the video play view 103 and the user interaction control 106.

On this basis, taking the user clicking a position A on the progress bar 105 as an example. In response to detecting a first user operation, i.e., a click operation, on the progress adjusting control 105 (the progress bar), the video stream viewing application may adjust progress of a currently playing video in the video page and update progress displayed in the progress adjusting control; and an adjustment result is shown in FIG. 1B.

Figure 2:
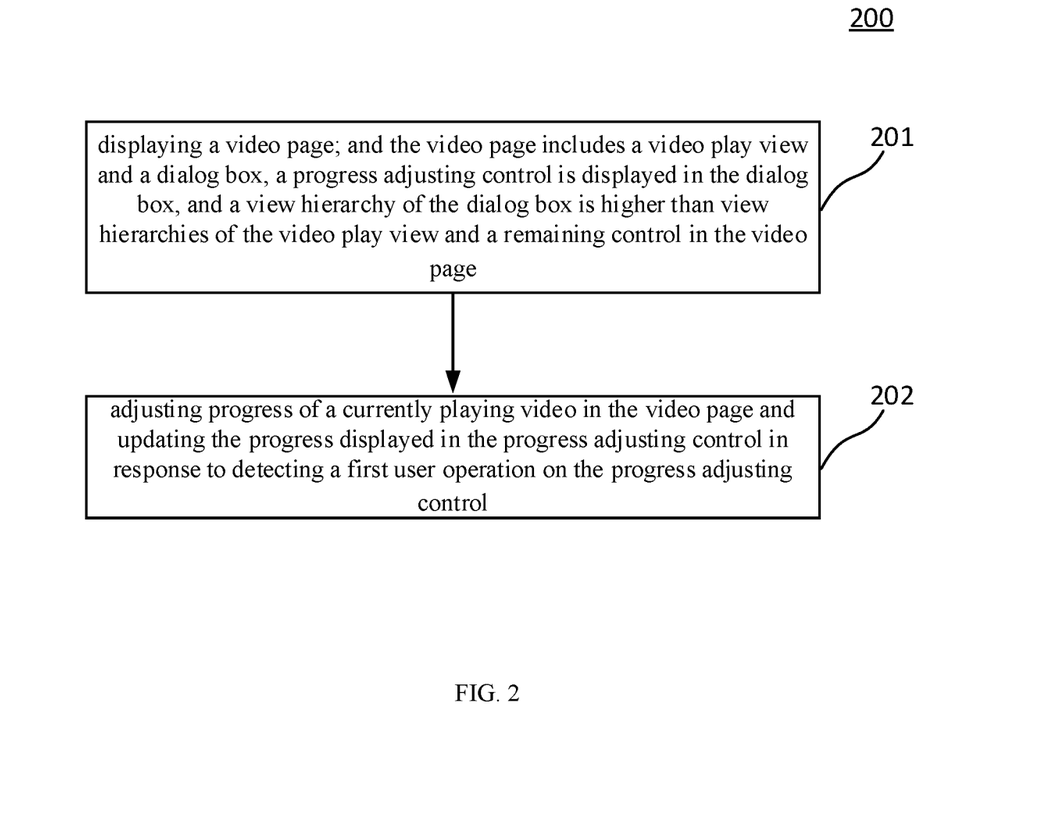
FIG. 2 is a flow chart of some embodiments of a video page display method according to the present disclosure.

With continued reference to FIG. 2, a flow 200 of some embodiments of a video page display method according to the present disclosure is shown. The video page display method includes the following steps.

Step 201: displaying a video page. The video page includes a video play view and a dialog box, a progress adjusting control is displayed in the dialog box, and a view hierarchy of the dialog box is higher than view hierarchies of the video play view and a remaining control in the video page.

Figure 3A:
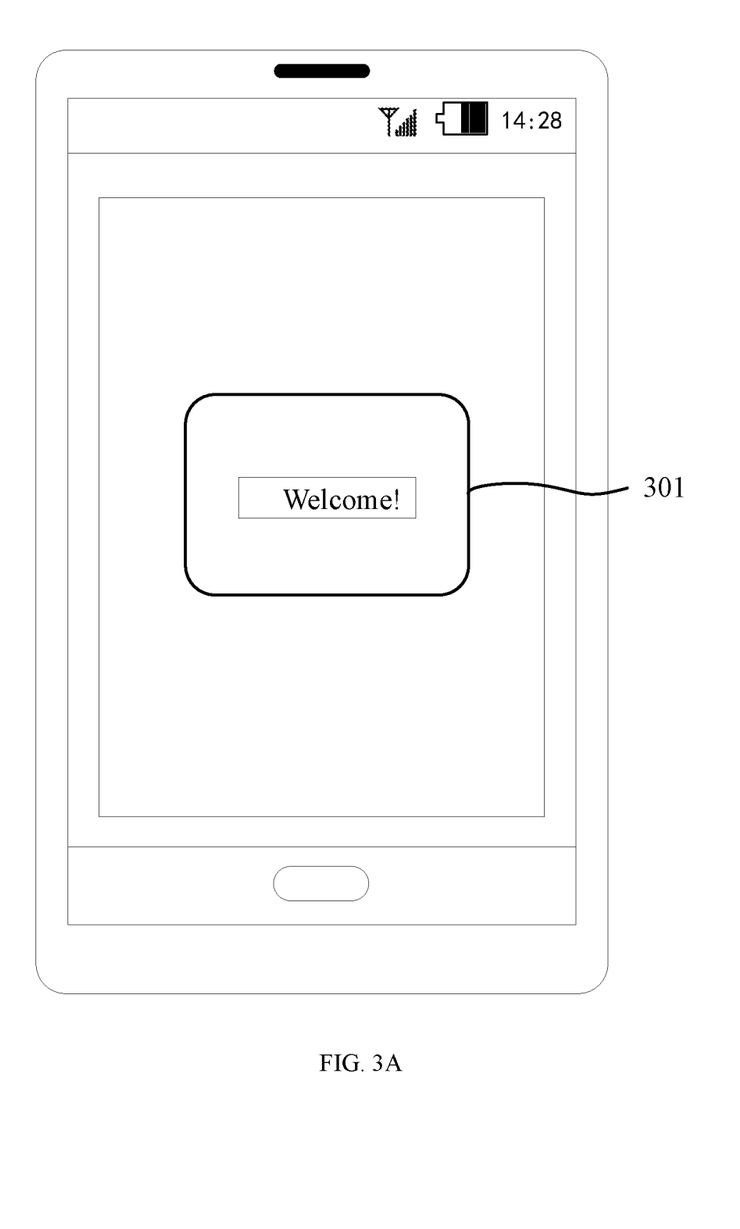
FIG. 3A and FIG. 3B show exemplary application scenarios of a common dialog box.
Figure 3B:
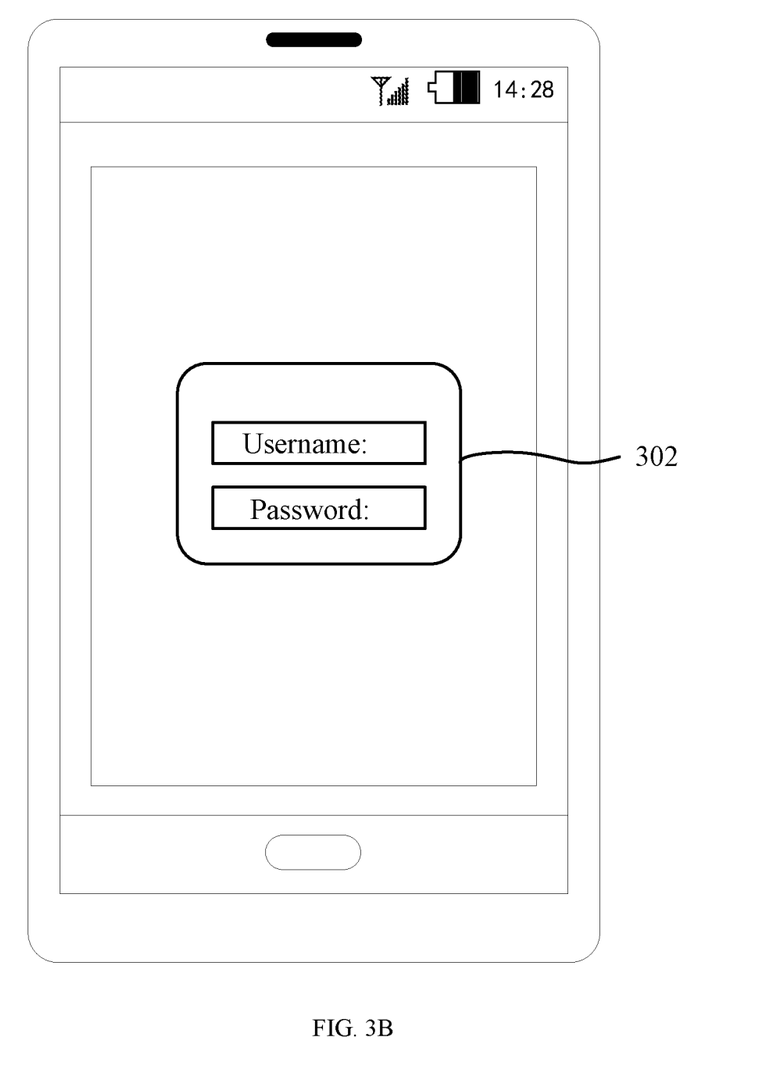

In some embodiments, the executive body of the video page display method (e.g., the smartphone in FIG. 1A) may display the video page. The video page may be a page that supports video play, and the user may watch various videos through the video page. The video page may include the video play view and the dialog box. The video play view may be used to play videos. In practice, the dialog box may be classified into a list dialog box, a single-selection dialog box, a multi-selection dialog box, a dialog box with a custom view, etc., according to different functions. Some operating systems provide diverse types of dialog boxes for use, and the existing dialog box may also be modified as needed. As an example, the dialog box may be achieved by a function provided in the operating system (e.g., Dialog Fragment, Dialog, etc.). As an example, FIG. 3A and FIG. 3B show exemplary application scenarios of a common dialog box, and 301 and 302 are both dialog boxes. It may be understood that styles of the dialog box may be diverse, and a border of the dialog box may not be displayed as required.

Generally, a video page usually includes a plurality of views or controls. As examples, it may include a video play view, a dialog box displaying a progress adjusting control, a user interaction control, etc. Therefore, it is necessary to specify view hierarchies of respective views or controls in the video page to ensure normal display and avoid causing some views to be occluded by mistake. Because the view hierarchy of the dialog box is higher than the view hierarchies of the video play view and the remaining control in the video page, the video progress adjustment operation of a user may be preferentially responded to.

According to requirement, the progress adjusting control may be displayed in the dialog box, so that the progress adjusting control may be independent of the video page, so as to achieve multiplexing the progress adjusting control between different pages.

Step 202: adjusting progress of a currently playing video in the video page and updating the progress displayed in the progress adjusting control in response to detecting a first user operation on the progress adjusting control.

In some embodiments, the user may execute the first user operation on the progress adjusting control. The first user operation may be various operations on the progress adjusting control. For example, the first user operation may be a touch operation such as clicking and sliding. Optionally, the first user operation may also be a voice input operation. For example, the user may enter speech "fast forward". The above-described executive body may perform semantic analysis on the speech inputted by the user to facilitate subsequent processing.

In response to detecting the first user operation on the progress adjusting control, the above-described executive body may adjust the progress of the currently playing video in the video page and update the progress displayed in the progress adjusting control. For example, the user may slide on the progress bar control, and the executive body may adjust the progress of the currently playing video according to a sliding distance of the user and update the progress displayed in the progress adjusting control. It may be understood that a sequence of adjusting the progress of the currently playing video on the video page and updating the progress displayed in the progress adjusting control may be adjusted according to actual needs, which is not limited in the present disclosure.

In some optional implementation modes of some embodiments, in response to detecting a second user operation on a region of the video page other than the progress adjusting control, a processing is performed by a control other than the progress adjusting control in the video page. In these implementation modes, the second user operation on the region other than the progress adjusting control may be processed by the remaining control in the page, so as to achieve different processing on the progress adjustment operation and other user operations.

In the video page display method provided by some embodiments of the present disclosure, because the video page includes a dialog box, and the view hierarchy of the dialog box is located at the uppermost hierarchy, the video progress adjustment operation of the user may be preferentially responded to. In addition, because the dialog box is an independent window and may be attached to any interface, so as to achieve multiplexing the progress adjusting control between different interfaces.

Figure 4:
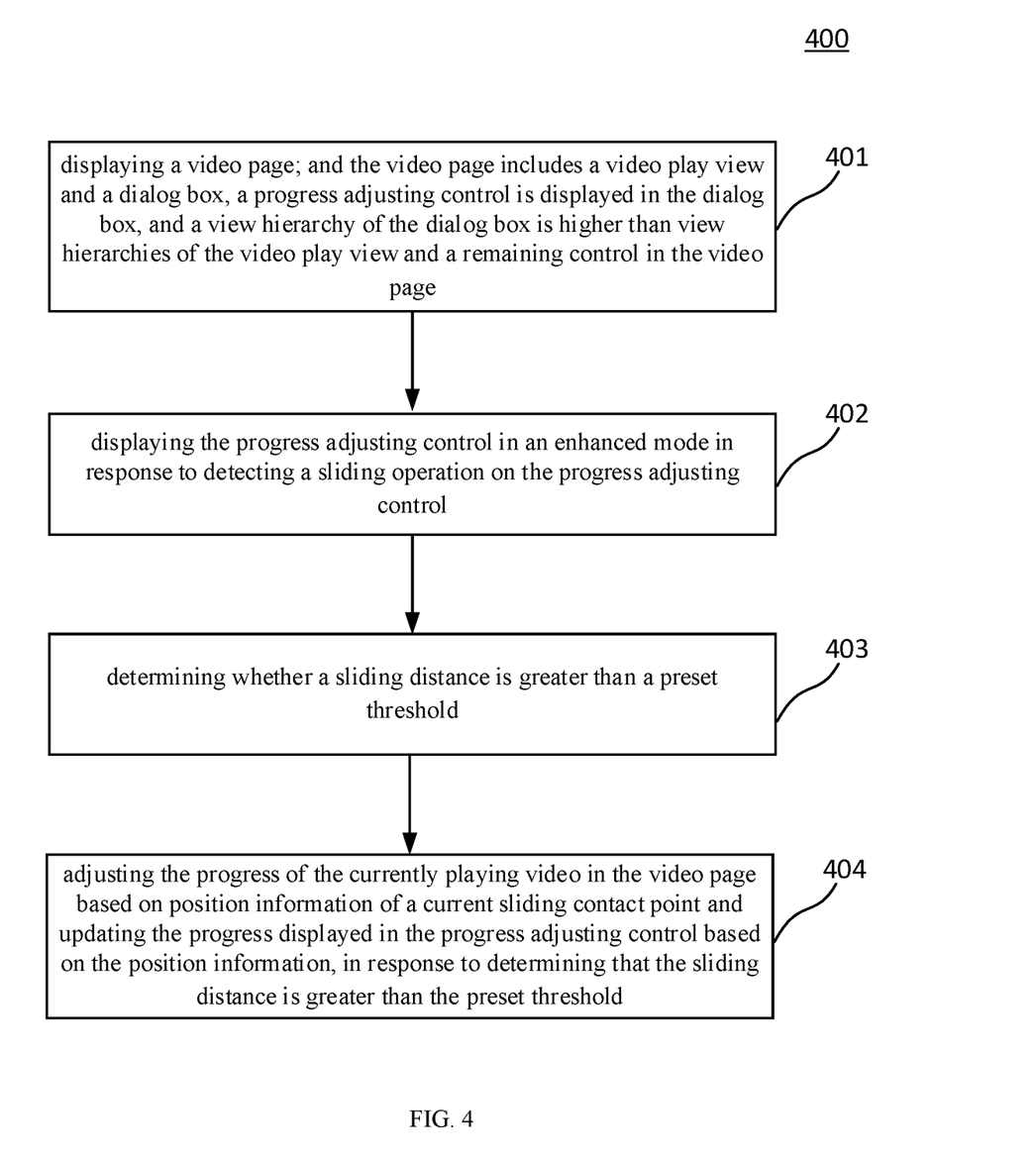
FIG. 4 is a flow chart of other embodiments of a video page display method according to the present disclosure.

With further reference to FIG. 4, a flow 400 of other embodiments of the video page display method is shown. The process 400 of the video page display method includes the following steps.

Step 401: displaying a video page. The video page includes a video play view and a dialog box, a progress adjusting control is displayed in the dialog box, and a view hierarchy of the dialog box is higher than view hierarchies of the video play view and a remaining control in the video page.

In some embodiments, step 201 in FIG. 2 may be referred to for specific implementation of step 401 and technical effects brought about thereby, and no details are repeated here.

Step 402: displaying the progress adjusting control in an enhanced mode in response to detecting a sliding operation on the progress adjusting control.

In some embodiments, in response to detecting a sliding operation on the progress adjusting control, the above-described executive body may display the progress adjusting control in an enhanced mode. The enhanced mode may be a more eye-catching display mode, and according to actual needs, may be a style with thicker lines, larger images, higher color saturation, etc., so as to effectively remind the user and enhance interactivity.

Step 403: determining whether a sliding distance is greater than a preset threshold.

In some embodiments, the executive body may determine whether the sliding distance is greater than the preset threshold. The sliding distance may be a distance that a touch medium (a finger, a stylus, etc.) slides on a screen. On this basis, the sliding distance may be compared with the preset threshold to determine whether the sliding distance is greater than the preset threshold. If the sliding distance is greater than the preset threshold, step 403 may be continued. Optionally, if the sliding distance is less than or equal to the preset threshold, the operation may be abandoned without executing subsequent steps. In practice, the sliding distance caused by misoperation is generally relatively small, so, by comparing with the preset threshold, unnecessary video progress adjustment caused by user's misoperation can be avoided.

Step 404: adjusting the progress of the currently playing video in the video page based on position information of a current sliding contact point and updating the progress displayed in the progress adjusting control based on the position information, in response to determining that the sliding distance is greater than the preset threshold.

In some embodiments, in response to determining that the sliding distance is greater than the preset threshold, the progress of the currently playing video in the video page may be adjusted based on the position information of the current sliding contact point, and the progress displayed in the progress adjusting control may be updated. Specifically, as an example, the progress of the currently playing video may be adjusted to the progress corresponding to the current sliding contact point. As compared with adjusting the video progress according to the sliding distance and updating the progress displayed in the progress adjusting control, the updating mode based on the position information of the current sliding contact point may make video progress adjustment more accurate, and the video progress adjustment can be achieved in a range of the entire progress bar.

As may be seen from FIG. 4, as compared with description of some embodiments corresponding to FIG. 2, by comparing the sliding distance with the preset threshold, unnecessary video progress adjustment due to a user's misoperation may be avoided. In addition, the updating mode based on the position information of the current sliding contact point may make video progress adjustment more accurate, and the video progress adjustment can be achieved in a range of the entire progress bar.

Figure 5:
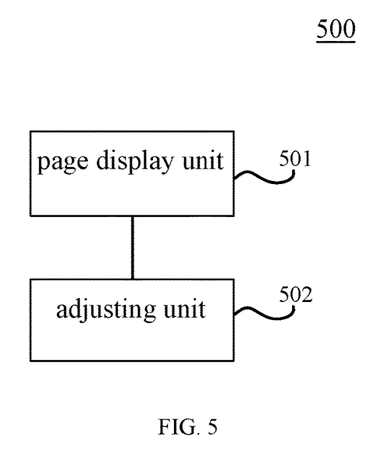
FIG. 5 is a structural schematic diagram of some embodiments of a video page display apparatus according to the present disclosure.

Further referring to FIG. 5, as the implementation of the method shown in the above-described respective diagrams, the present disclosure provides some embodiments of a video page display apparatus, these apparatus embodiments correspond to those method embodiments shown in FIG. 2, and the apparatus may be specifically applied to various electronic devices.

As shown in FIG. 5, a video page display apparatus 500 according to some embodiments includes: a page display unit 501 and an adjusting unit 502. The page display unit 501 is configured to display a video page, the video page includes a video play view and a dialog box, a progress adjusting control is displayed in the dialog box, and a view hierarchy of the dialog box is higher than view hierarchies of the video play view and a remaining control in the video page. The adjusting unit 502 is configured to adjust progress of a currently playing video in the video page and update the progress displayed in the progress adjusting control, in response to detecting a first user operation on the progress adjusting control.

In some embodiments, embodiments corresponding to FIG. 2 may be referred to for specific implementation of the page display unit 501 and the adjusting unit 502 included in the video page display apparatus 500 and technical effects brought about thereby, and no details will be repeated here.

In an optional implementation mode of some embodiments, the apparatus 500 further includes a processing unit (not shown in FIGS.). The processing unit is configured to, in response to detecting a second user operation on a region of the video page other than the progress adjusting control, process the second user operation by the remaining control in the video page.

In an optional implementation mode of some embodiments, the first user operation is a sliding operation, and the adjusting unit 502 is further configured to: determine whether a sliding distance is greater than a preset threshold, and adjust progress of the currently playing video in the video page based on position information of the current sliding contact point and update the progress displayed in the progress adjusting control based on the position information of the current sliding contact point in response to determining that the sliding distance is greater than the preset threshold.

In an optional implementation mode of some embodiments, the adjusting unit 502 is further configured to: display the progress adjusting control in an enhanced mode.

In some embodiments, because the video page includes a dialog box, and the view hierarchy of the dialog box is higher than the view hierarchy of the video play view and the remaining control in the video page, the video progress adjustment operation of a user may be preferentially responded to. In addition, because the dialog box is an independent window and may be attached to any page, so as to achieve multiplexing a progress adjusting control between different pages.

Hereinafter, referring to FIG. 6, it shows a structural schematic diagram of an electronic device 600 (e.g., the terminal device in FIG. 1) suitable for implementing some embodiments of the present disclosure. The electronic device according to some embodiments of the present disclosure may include, but not limited to, a mobile terminal such as a mobile phone, a laptop, a digital broadcast receiver, a Personal Digital Assistant (PDA), a Portable Android Device (PAD), a Portable Multimedia Player (PMP), a vehicle-mounted terminal (e.g., a vehicle-mounted navigation terminal), etc., and a stationary terminal such as a digital TV, a desktop computer, etc. The electronic device shown in FIG. 6 is only an example, and should not impose any limitation on the function and use scope of the embodiments of the present disclosure.

Figure 6:
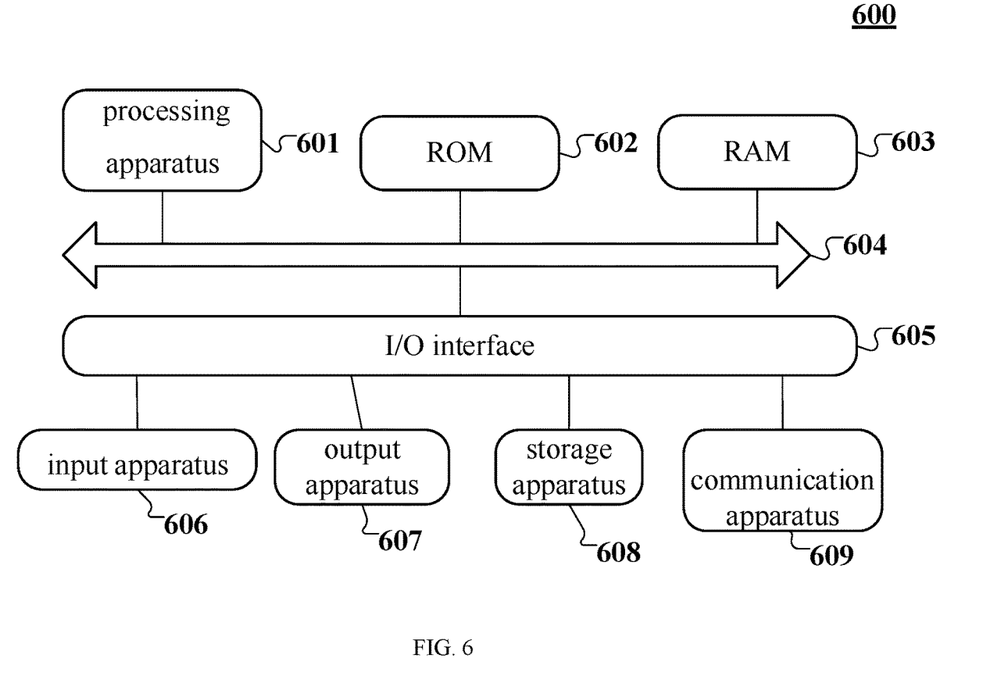
FIG. 6 is a structural schematic diagram of an electronic device suitable for implementing some embodiments of the present disclosure.

As shown in FIG. 6, the electronic device 600 may include a processing apparatus (e.g., a central processing unit, a graphics processor, etc.) 601, which may execute various appropriate actions and processing according to a program stored in a Read-Only Memory (ROM) 602 or a program loaded from a storage device 608 into a Random Access Memory (RAM) 603. The Random Access Memory (RAM) 603 further stores various programs and data required for operation of the electronic device 600. The processing apparatus 601, the ROM 602, and the RAM 603 are connected with each other through a bus 604. An input/output (I/O) interface 605 is also coupled to the bus 604.

Usually, apparatuses below may be coupled to the I/O interface 605: an input apparatus 606 including, for example, a touch screen, a touch pad, a keyboard, a mouse, a camera, a microphone, an accelerometer, a gyroscope, etc.; an output apparatus 607 including, for example, a Liquid Crystal Display (LCD), a speaker, a vibrator, etc.; a storage apparatus 608 including, for example, a memory card, etc.; and a communication apparatus 609. The communication apparatus 609 may allow the electronic device 600 to perform wireless or wired communication with other electronic devices so as to exchange data. Although FIG. 6 shows the electronic device 600 having various apparatuses, it should be understood that it is not required to implement or have all the apparatuses shown, and the electronic device 600 may alternatively implement or have more or fewer apparatuses. Each block shown in FIG. 6 may represent one apparatus, or may also represent a plurality of apparatuses as needed.

Particularly, according to some embodiments of the present disclosure, the flows as described above with reference to the flow charts may be implemented as computer software programs. For example, some embodiments of the present disclosure include a computer program product, comprising a computer program carried on a computer-readable medium, and the computer program includes program codes for executing the method illustrated in the flow chart. In such embodiments, the computer program may be downloaded and installed from the network via the communication apparatus 609, or installed from the storage apparatus 608, or installed from the ROM 602. In the case where the computer program is executed by the processing apparatus 601, the above-described functions limited in the methods according to some embodiments of the present disclosure is executed.

It should be noted that the computer-readable medium according to some embodiments of the present disclosure may be a computer-readable signal medium or a computer-readable storage medium, or any combination of the above two. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but not limited to: an electrical connection having one or more conductors, a portable computer diskette, a hard disk, a Random Access Memory (RAM), a Read-Only Memory (ROM); an Erasable Programmable Read-Only Memory (EPROM or Flash memory); an optical fiber, a Portable Compact Disc Read-Only Memory (CD-ROM); an optical storage device; a magnetic storage device; or any suitable combination of the above. In some embodiments of the present disclosure, a computer-readable storage medium may be any tangible medium that includes or stores a program, and the program may be used by or in conjunction with an instruction executing system, an apparatus, or a device. In some embodiments of the present disclosure, the computer-readable signal medium may include a data signal propagated in baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, the apparatus, or the device. The program code embodied on the computer-readable medium may be transmitted by using any suitable medium, including, but not limited to, an electrical wire, an optical cable, a Radio Frequency (RF), etc., or any suitable combination of the above.

In some implementation modes, the client and the server may communicate with any network protocol currently known or to be researched and developed in the future such as HyperText Transfer Protocol (HTTP), and may communicate (via a communication network) and interconnect with digital data in any form or medium. Examples of communication networks include a Local Area Network ("LAN"), a Wide Area Network ("WAN"), the Internet, and an end-to-end network (e.g., an ad hoc end-to-end network), as well as any network currently known or to be researched and developed in the future.

The above-described computer-readable medium may be included in the above-described electronic device; or may also exist alone without being assembled into the electronic device. The above-described computer-readable medium carries one or more programs, and in the case where the one or more programs are executed by the electronic device, the electronic device is configured to: display a video page, wherein the video page includes a video play view and a dialog box, a progress adjusting control is displayed in the dialog box, and a view hierarchy of the dialog box is higher than view hierarchies of the video play view and remaining control in the video page; and adjust the progress of the currently playing video in the video page and update the progress displayed in the progress adjusting control, in response to detecting a first user operation on the progress adjusting control.

The computer program codes for executing the operations according to some embodiments of the present disclosure may be written in one or more programming languages or a combination thereof. The above-described programming languages include object-oriented programming languages such as Java, Smalltalk, C++, and also include conventional procedural programming languages such as "C" language or similar programming languages. The program code may execute entirely on the user's computer, partly on the user's computer, as a stand-alone software package, partly on the user's computer and partly on a remote computer or entirely on the remote computer or server. In the case where relating to the remote computer, the remote computer may be connected to the user's computer through any type of network, including a Local Area Network (LAN) or a Wide Area Network (WAN), or connected to an external computer (for example, connecting through the Internet using an Internet Service Provider).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which includes one or more executable instructions for implementing specified logical function(s). It should also be noted that, in some alternative implementations, the functions noted in the block may occur out of the order noted in the accompanying drawings. For example, two blocks shown in succession may, in fact, be executed substantially concurrently, or the blocks may sometimes be executed in a reverse order, depending upon the functionality involved. It should also be noted that each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units described in some embodiments of the present disclosure may be implemented by means of software, or may also be implemented by means of hardware. The described unit may also be provided in a processor, which, for example, may be described as: a processor, including a page display unit and an adjusting unit. Names of these units do not constitute a limitation of the units themselves in some cases, for example, the page display unit may also be described as "a unit that displays a video page".

The functions described herein above in the present disclosure may be executed, at least partially, by one or more hardware logic components. For example, without limitation, available exemplary types of hardware logic components include: a Field Programmable Gate Array (FPGA), an Application Specific Integrated Circuit (ASIC), an Application Specific Standard Product (ASSP), a System on Chip (SOC), a Complex Programmable Logical Device (CPLD), etc.

According to one or more embodiments of the present disclosure, a video page display method is provided. The video page display method includes: displaying a video page, wherein the video page includes a video play view and a dialog box, a progress adjusting control is displayed in the dialog box, and a view hierarchy of the dialog box is higher than view hierarchies of the video play view and a remaining control in the video page; and adjusting progress of a currently playing video in the video page and updating progress displayed in the progress adjusting control, in response to detecting a first user operation on the progress adjusting control.

According to one or more embodiments of the present disclosure, the video page display method further includes: in response to detecting a second user operation on a region of the video page other than the progress adjusting control, processing the second user operation by the remaining control in the video page.

According to one or more embodiments of the present disclosure, the first user operation is a sliding operation, and adjusting the progress of the currently playing video in the video page and updating the progress displayed in the progress adjusting control, includes: determining whether a sliding distance is greater than a preset threshold; and adjusting the progress of the currently playing video in the video page based on position information of a current sliding contact point and updating the progress displayed in the progress adjusting control based on the position information, in response to determining that the sliding distance is greater than the preset threshold.

According to one or more embodiments of the present disclosure, before determining whether the sliding distance is greater than the preset threshold, the method further includes: displaying the progress adjusting control in an enhanced mode.

According to one or more embodiments of the present disclosure, a video page display apparatus is provided. The video page display apparatus includes: a page display unit, configured to display a video page; wherein the video page comprises a video play view and a dialog box; a progress adjusting control is displayed in the dialog box; and a view hierarchy of the dialog box is higher than view hierarchies of the video play view and a remaining control in the video page; and an adjusting unit, configured to adjust progress of a currently playing video in the video page and updating progress displayed in the progress adjusting control, in response to detecting a first user operation on the progress adjusting control According to one or more embodiments of the present disclosure, the apparatus further includes: a processing unit, configured to, in response to detecting a second user operation on a region of the video page other than the progress adjusting control, process the second user operation by the remaining control in the video page.

According to one or more embodiments of the present disclosure, the first user operation is a sliding operation, and the adjusting unit is further configured to: determine whether a sliding distance is greater than a preset threshold; and adjust the progress of the currently playing video in the video page based on position information of a current sliding contact point and update the progress displayed in the progress adjusting control based on the position information of the current sliding contact point, in response to determining that the sliding distance is greater than the preset threshold.

According to one or more embodiments of the present disclosure, the adjusting unit is further configured to: display the progress adjusting control in an enhanced mode.

According to one or more embodiments of the present disclosure, an electronic device is provided. The electronic device includes one or more processors; and a storage apparatus on which one or more programs are stored, wherein in the case where the one or more programs are executed by the one or more processors, the method according to any one of the above is realized by the one or more processors.

According to one or more embodiments of the present disclosure, a computer-readable medium is provided. The computer-readable medium is stored on the computer-readable medium, and in the case where the computer program is executed by a processor, the method according to any one of the above is realized.

According to one or more embodiments of the present disclosure, a computer program is provided. The computer program includes a program code. In the case where the computer program is run by a computer, the method according to any one of the above is executed by the program code.

The above description is merely description of some preferred embodiments of the present disclosure and technical principles applied thereto. Those skilled in the art should understand that the scope of invention involved in the embodiments of the present disclosure is not limited to the technical solution formed by the specific combination of the above-described technical features, and should also cover, without departing from the above-described inventive concept, other technical solutions formed by any combination of the above-described technical features or equivalent features thereof. For example, a technical solution is formed by mutually replacing the above-described features with the technical features disclosed (but not limited to) in the embodiments of the present disclosure with similar functions.

What is claimed is:

1. A video page display method, comprising:
    displaying a video page, wherein the video page comprises a video play view and a dialog box, a progress adjusting control is displayed in the dialog box, and a view hierarchy of the dialog box is higher than view hierarchies of the video play view and a remaining control in the video page; and
    adjusting progress of a currently playing video in the video page and updating progress displayed in the progress adjusting control in response to detecting a first user operation on the progress adjusting control, wherein the first user operation is a sliding operation, and wherein the adjusting progress of a currently playing video in the video page and updating progress displayed in the progress adjusting control further comprises:
    determining whether a sliding distance is greater than a preset threshold, and
    adjusting the progress of the currently playing video in the video page based on position information of a current sliding contact point and updating the progress displayed in the progress adjusting control based on the position information in response to determining that the sliding distance is greater than the preset threshold.

2. The method according to claim 1, further comprising:
    in response to detecting a second user operation on a region of the video page other than the progress adjusting control, processing the second user operation by the remaining control in the video page.

3. The method according to claim 1, wherein before determining whether the sliding distance is greater than the preset threshold, the method further comprises:
    displaying the progress adjusting control in an enhanced mode.

4. An electronic device, comprising:
    one or more processors; and
    a storage apparatus on which one or more programs are stored, wherein the one or more programs, upon execution by the one or more processors, cause the one or more processors to perform operations comprising:
    displaying a video page, wherein the video page comprises a video play view and a dialog box, a progress adjusting control is displayed in the dialog box, and a view hierarchy of the dialog box is higher than view hierarchies of the video play view and a remaining control in the video page;
    adjusting progress of a currently playing video in the video page and updating progress displayed in the progress adjusting control in response to detecting a first user operation on the progress adjusting control, wherein the first user operation is a sliding operation, and wherein the adjusting progress of a currently playing video in the video page and updating progress displayed in the progress adjusting control further comprises:
    determining whether a sliding distance is greater than a preset threshold, and
    adjusting the progress of the currently playing video in the video page based on position information of a current sliding contact point and updating the progress displayed in the progress adjusting control based on the position information in response to determining that the sliding distance is greater than the preset threshold.

5. A computer-readable medium, wherein a computer program is stored on the computer-readable medium, and wherein the computer program upon execution by a processor, causes the processor to perform operations comprising:
    displaying a video page, wherein the video page comprises a video play view and a dialog box, a progress adjusting control is displayed in the dialog box, and a view hierarchy of the dialog box is higher than view hierarchies of the video play view and a remaining control in the video page;
    adjusting progress of a currently playing video in the video page and updating progress displayed in the progress adjusting control in response to detecting a first user operation on the progress adjusting control, wherein the first user operation is a sliding operation, and wherein the adjusting progress of a currently playing video in the video page and updating progress displayed in the progress adjusting control further comprises:
    determining whether a sliding distance is greater than a preset threshold, and
    adjusting the progress of the currently playing video in the video page based on position information of a current sliding contact point and updating the progress displayed in the progress adjusting control based on the position information in response to determining that the sliding distance is greater than the preset threshold.

6. A computer program, comprising a program code, wherein, in a case where the computer program is run by a computer, the method according to claim 1 is executed by the program code.

7. An electronic device, comprising:
one or more processors; and
a storage apparatus, on which one or more programs are stored,
wherein, in a case where the one or more programs are executed by the one or more processors, the method according to claim 2 is realized by the one or more processors.

8. An electronic device, comprising:
one or more processors; and
a storage apparatus, on which one or more programs are stored,
wherein, in a case where the one or more programs are executed by the one or more processors, the method according to claim 3 is realized by the one or more processors.

9. A computer-readable medium, wherein a computer program is stored on the computer-readable medium, and in a case where the computer program is executed by a processor, the method according to claim 2 is realized.

10. A computer-readable medium, wherein a computer program is stored on the computer-readable medium, and in a case where the computer program is executed by a processor, the method according to claim 3 is realized.

11. A computer program, comprising a program code, wherein, in a case where the computer program is run by a computer, the method according to claim 2 is executed by the program code.

12. A computer program, comprising a program code, wherein, in a case where the computer program is run by a computer, the method according to claim 4 is executed by the program code.

13. The electronic device according to claim 4, the operations further comprising:
in response to detecting a second user operation on a region of the video page other than the progress adjusting control, processing the second user operation by the remaining control in the video page.

14. The electronic device according to claim 4, wherein before determining whether the sliding distance is greater than the preset threshold, the operations further comprise:
displaying the progress adjusting control in an enhanced mode.

* * * * *